US010480941B2

(12) United States Patent
Chowdhary et al.

(10) Patent No.: US 10,480,941 B2
(45) Date of Patent: *Nov. 19, 2019

(54) RECONFIGURABLE SENSOR UNIT FOR ELECTRONIC DEVICE

(71) Applicant: STMicroelectronics, Inc., Coppell, TX (US)

(72) Inventors: Mahesh Chowdhary, San Jose, CA (US); Sankalp Dayal, Fremont, CA (US)

(73) Assignee: STMicroelectronics, Inc., Coppell, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/284,448

(22) Filed: Feb. 25, 2019

(65) Prior Publication Data

US 2019/0186916 A1 Jun. 20, 2019

Related U.S. Application Data

(63) Continuation of application No. 14/749,118, filed on Jun. 24, 2015, now Pat. No. 10,260,877.

(60) Provisional application No. 62/121,104, filed on Feb. 26, 2015.

(51) Int. Cl.
*G01C 19/32* (2006.01)
*G01C 19/5776* (2012.01)
*G01P 15/18* (2013.01)

(52) U.S. Cl.
CPC ......... *G01C 19/32* (2013.01); *G01C 19/5776* (2013.01); *G01P 15/18* (2013.01)

(58) Field of Classification Search
None
See application file for complete search history.

(56) References Cited

U.S. PATENT DOCUMENTS 10,142,789 B2 * 11/2018 Chowdhary .......... H04W 4/027
2011/0215952 A1 9/2011 Aria et al.
2014/0201126 A1 7/2014 Zadeh et al.
(Continued)

OTHER PUBLICATIONS

Alanezi et al: "Impact of Smartphone Position on Sensor Values and Context Discovery," May 1, 2013 (16 pages).
(Continued)

*Primary Examiner* — Roy Y Yi
(74) *Attorney, Agent, or Firm* — Crowe & Dunlevy

(57) ABSTRACT

A sensor chip is mounted on a PCB and electrically connected to a SOC mounted on the PCB via at least one conductive trace. The sensor chip includes configuration registers storing and outputting configuration data, and a PLD receiving digital data. The PLD performs an extraction of features of the digital data in accordance with the configuration data, and the configuration data includes changeable parameters of the extraction. A classification unit processes the extracted features of the digital data so as to generate a context of an electronic device into which the sensor chip is incorporated relative to its surroundings, the processing being performed in using a processing technique operating in accordance with the configuration data. The configuration data also includes changeable parameters of the processing technique. The classification unit outputs the context to data registers for storage.

35 Claims, 2 Drawing Sheets

(56) References Cited

U.S. PATENT DOCUMENTS

2015/0039260 A1    2/2015   Niskanen et al.
2015/0062130 A1    3/2015   Ho

OTHER PUBLICATIONS

First Office Action and Search Report from co-pending CN Appl. No. 201510510921.7 dated Mar. 20, 2018 (8 pages).
Miluzzo, Emiliano et al: "Pocket, Bag, Hand, etc.—Automatically Detecting Phone Context Through Discovery," CS Department, Dartmouth College, Hanover, NH, US, 2011 (5 pages).
Shi, Yue et al: "A Rotation Based Method for Detecting On-Body Positions of Mobile Devices," UbiComp'11, Sep. 17-21, 2011, Beijing, CN, pp. 559-560.

* cited by examiner

RECONFIGURABLE SENSOR UNIT FOR ELECTRONIC DEVICE

PRIORITY CLAIM

This application is a continuation of U.S. patent application Ser. No. 14/749,118, filed on Jun. 24, 2015, which claims the priority benefit of U.S. Patent Application No. 62/121,104, filed on Feb. 26, 2015, the contents of both of which are hereby incorporated by reference in their entirety to the maximum extent allowable by law.

TECHNICAL FIELD

This disclosure relates to the field of sensors, and more particularly, to reconfigurable sensors for electronic devices.

BACKGROUND

Portable electronic devices such as smartphones, smartwatches, other wearables, and tablets are ever more popular in the world today. Certain functions of these devices depend on the device having knowledge of the device's orientation, or of conditions of the environment in which the device currently resides. For example, a smartphone may rotate its user interface from a portrait view to a landscape view based upon the orientation in which the smartphone is held. As another example, a smartwatch may activate its display or alter the brightness of its display based upon the orientation in which the smartwatch is held, or based upon the light in the environment in which the smartwatch resides, respectively. Such portable electronic devices may also log the physical activity of a user. For example, a smartphone or smartwatch may count the number of steps taken by a user.

In order to determine the orientation of the device or conditions of the environment in which the device resides, sensors such as accelerometers and gyroscopes are employed. Typically, the electronic device includes a system on chip (SOC) that receives raw data from the sensors, and then determines the device orientation or conditions of the environment.

While this approach is effective and enables the electronic device to perform commercially desirable functions, the constant acquisition of data from the sensors by the SOC can result in higher than desirable power consumption. The lowering of power consumption is a continual commercial desire for such electronic devices. Therefore, hardware and techniques for allowing the continual acquisition of the sensor data while reducing power consumption are desirable.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Disclosed herein is a sensor chip mounted on a printed circuit board (PCB) and electrically coupled to a system on chip (SoC) mounted on the PCB via at least one conductive trace. The sensor chip includes configuration registers configured to store and output configuration data, and a programmable logic device (PLD) configured to receive digital data. The PLD is configured to perform an extraction of features of the digital data in accordance with the configuration data, the configuration data including changeable parameters of the extraction. A classification unit is configured to process the extracted features of the digital data so as to generate a context of an electronic device into which the sensor chip is incorporated relative to its surroundings, the processing being performed in using a processing technique operating in accordance with the configuration data. The configuration data also includes changeable parameters of the processing technique. The classification unit is configured to output the context to the data registers for storage.

Computed feature registers may store the extracted features of the digital data.

The changeable parameters of the extraction may include which features of the digital data are selected to extract.

The features of the digital data selected to extract may include at least one of mean acceleration, radian acceleration, number of acceleration peaks, number of zero crosses, peak acceleration values, linear acceleration values, energy in bands, mean of roll, pitch, and yaw, variance of roll, pitch, and yaw, mean of linear acceleration, and variance of linear acceleration.

The configuration data may contain parameters for operating the sensor chip between a low power consumption mode and a high power consumption mode. In the low power consumption mode, the PLD may extract a first subset of features of the digital data, and in the high power consumption mode, the PLD may extract at least a second subset of features of the digital data. The second subset may contain more features of the digital data than the first subset. The PLD may be configured to selectively switch between the low power consumption mode and the high power consumption mode.

The PLD may be configured to operate in the low power consumption mode until at least one of the extracted features exceeds a threshold, and to operate in the high power consumption mode for a period of time thereafter.

The sensor chip may include a MEMS sensing unit generating a plurality of analog data outputs, a selection circuit receiving the plurality of analog data outputs and configured to pass a selected one of the plurality of analog data outputs, and an analog to digital converter configured to convert the selected one of the plurality of analog data outputs to the digital data.

A charge pump may be configured to boost the selected one of the plurality of analog data outputs prior to conversion by the analog to digital converter.

The MEMS sensing unit may contain at least an accelerometer and a gyroscope, and the plurality of analog data outputs may include analog accelerometer data output and analog gyroscope data output.

The plurality of analog data outputs may also include analog output data from an external source.

The analog output data from the external source may include at least one of analog light sensor output data, analog magnetometer output data, analog barometer output data, analog microphone output data, and analog proximity sensor output data.

The selection circuit may select different ones of the plurality of analog data outputs to pass in accordance with the configuration data, and the configuration data may also include a selection change rate for the selection circuit.

The plurality of analog data outputs may include analog data outputs from the MEMS sensing unit in addition to analog data outputs from an external source, and the selection change rate may include a first selection change rate for the analog data outputs from the MEMS sensing unit and a second selection change rate for the analog data outputs from the external source, with the second selection change rate being lesser than the first selection change rate.

A digital filter may be configured to filter the digital data prior to extraction of the features by the PLD in accordance with a digital filtering technique, the filtering being performed in accordance with the configuration data. The configuration data may also include changeable parameters of the digital filtering technique.

The changeable parameters of the digital filtering technique may include which digital filtering technique is performed and/or which coefficients are used by the digital filtering technique.

A bus interface may be configured to receive the context from the data registers and to facilitate transmission of the context from the data registers to another device.

The bus interface may be an Inter-Integrated Circuit (I2C) bus interface.

The PLD may be configured to ignore digital data falling outside of a given range when extracting the features of the digital data, in accordance with the configuration data. The configuration data may also include the given range.

The classification unit may be an arithmetic logic unit (ALU).

The PLD may be an arithmetic logic unit (ALU).

The context of the electronic device relative to its surroundings may be at least one of a mode of locomotion of a user carrying the electronic device, a position of the electronic device on the body of the user, and a gesture in which the electronic device has been moved.

A gesture in which the electronic device has been moved may be at least one of raising the electronic device into position for screen viewing, shaking the electronic device, double tapping the electronic device, rotating the electronic device, and swiping the electronic device in at least one direction.

DETAILED DESCRIPTION

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Figure 1:
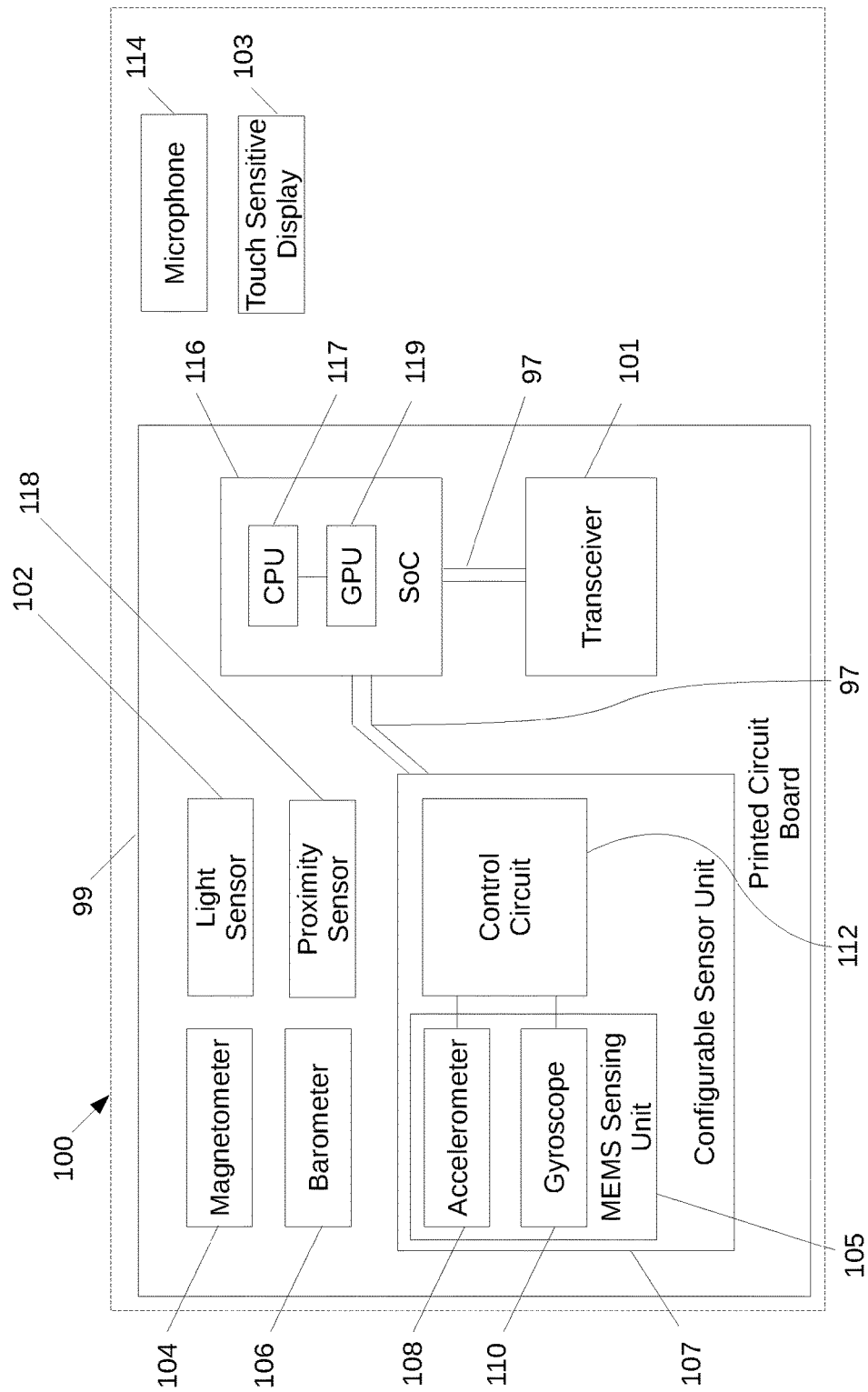
FIG. 1 is a schematic block diagram of an electronic device including a reconfigurable sensor unit in accordance with this disclosure.

With initial reference to FIG. 1, an electronic device 100 is now described. The electronic device 100 may be a smartphone, tablet, smartwatch, or other wearable device. The electronic device 100 includes a printed circuit board (PCB) 99 having various components mounted thereon. Conductive traces 97 printed on the PCB 99 serve to electrically couple the various components together in a desired fashion.

A system on chip (SoC) 116, which comprises a central processing unit (CPU) 117 coupled to a graphics processing unit (GPU) 119, is mounted on the PCB 99. Coupled to the SoC 116 are a transceiver 101 via which the SoC 116 can communicate with remote servers over the internet, and a touch sensitive display 103 via which the SoC 116 may display output and receive input. A variety of sensors are coupled to the SoC 116, including a light sensor 102 for determining the level of ambient light in the environment in which the electronic device 100 resides, a magnetometer 104 used to determine the orientation of the electronic device 100 with respect to the magnetic field of the Earth, a barometer 106 used to determine the air pressure in the environment (and thus, the altitude of the electronic device 100), a microphone 114 used to detect audible noises in the environment, and a proximity sensor 118 used to determine proximity of the user with respect to the electronic device 100.

A configurable sensor unit 107 is mounted on the PCB 99 spaced apart from the SoC 116, and coupled thereto by the conductive traces 97. The configurable sensor unit 107 includes an accelerometer 108 and/or gyroscope 110 coupled to a control circuit 112. The accelerometer 108 is used for determining accelerations experienced by the electronic device 100, and the gyroscope 110 is used for determining an orientation of the electronic device 100 with respect to the environment. The configurable sensor unit 107 may be formed from discrete components and/or integrated components and/or a combination of discrete components and integrated components, and may be formed as a package.

It should be understood that the configurable sensor unit 107 is not a portion of the SoC 116, and is a separate and distinct component from the SoC 116. Indeed, the sensor unit 107 and the SoC 116 are separate, distinct, mutually exclusive chips mounted on the PCB 99 at different locations and coupled together via the conductive traces 97.

In operation, the SoC 116 may acquire data from the various sensors 102, 103, 104, 106, 114, and 118 at an acquisition rate, and may process the data so as to determine a context of the electronic device 100 relative to its environment. The acquisition rate for these various sensors (with the exception of the touch sensitive display 103) may be relatively low due to the nature of the contexts to be determined from these sensors not necessitating a higher acquisition rate. Therefore, power consumption as a result of acquisition of data from these various sensors may be relatively low. Contexts will be explained below in detail.

On the other hand, the contexts to be determined from the accelerometer 108 and/or the gyroscope 100 may involve the use of a higher acquisition rate than the other sensors. Therefore, the configurable sensor unit 107 is used for data acquisition from the accelerometer 108 and/or the gyroscope 100, as it offers power savings. These power savings are realized by a control circuit 112 of the configurable sensor unit 107 that consumes less power than the SoC 116 performing acquisition of data from the accelerometer 108 and/or the gyroscope 110 and some processing of that data. So as to provide the same level of configurability as would be present were the SoC 116 performing the acquisition and processing of the data from the accelerometer 108 and/or the gyroscope 110, the sensor unit 107 may receive configuration data as input.

In operation, the control circuit 112, as stated, receives the configuration data as input. The control circuit 112 acquires data from the accelerometer 108 and/or the gyroscope 110, and processes the data so as to generate a context of the electronic device 100 relative to its surroundings. This processing is performed by the control circuit 112 using a processing technique operating in accordance with the configuration data received as input. The processed data is then output by the control circuit 112 to the SoC 116 for use thereby.

Figure 2:
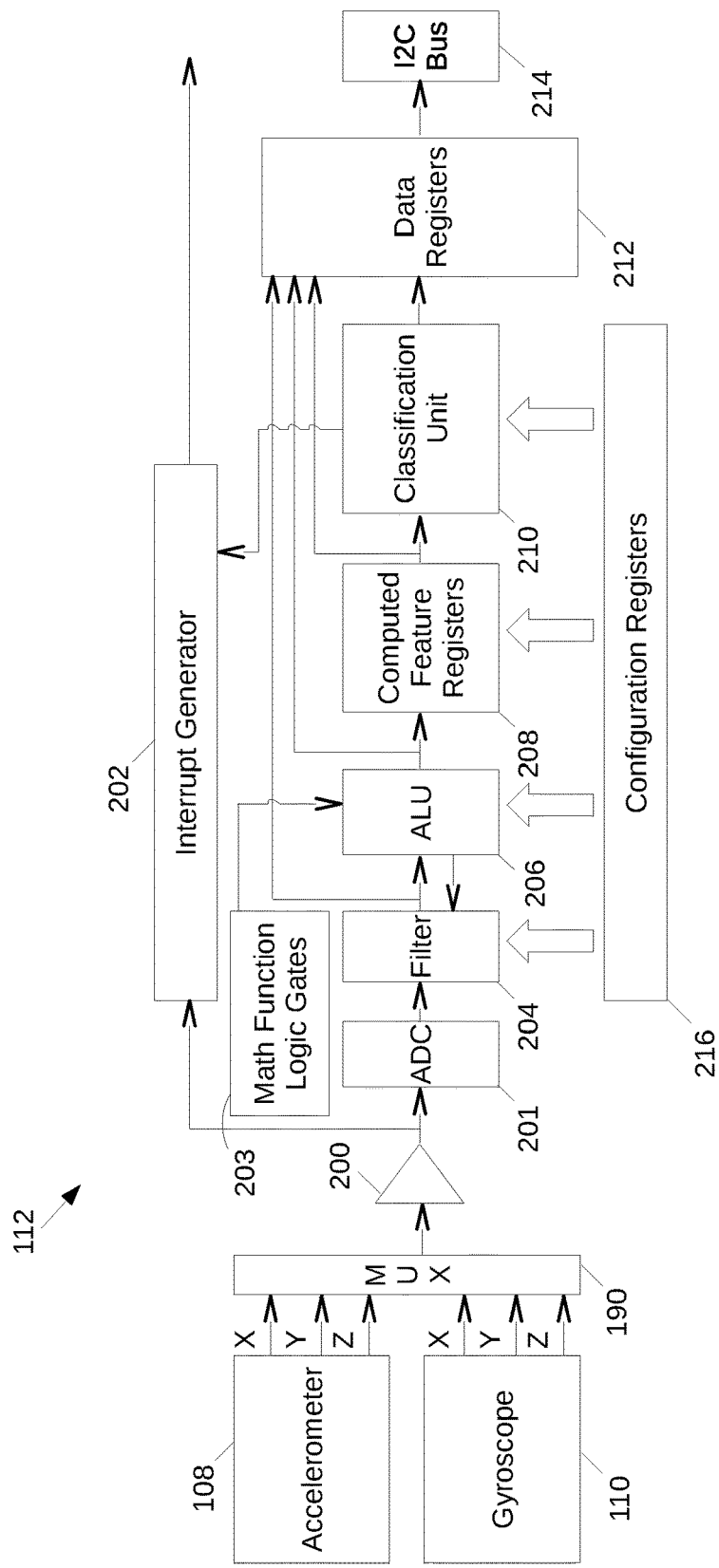
FIG. 2 is a schematic block diagram of the control circuit of the electronic device of FIG. 1.

With additional reference to FIG. 2, sample details of the control circuit 112 are now given. Although specifics will be described, it should be understood that the control circuit 112 may be made from any suitable components, and that any and all such designs are within the scope of this disclosure. It should also be understood that while certain functions and operations are described as being performed by certain components of the control circuit 112, the performance of those functions and operations by any suitable hardware is contemplated and within the scope of this disclosure.

The control circuit 112 includes a multiplexer 190 that receives three dimensional data in the X, Y, and Z directions from the accelerometer 108 and gyroscope 110. The output of the multiplexer 190 is fed to a charge pump 200, which in turn feeds its output to a filter 204. The filter feeds its output to a programmable logic device such as an arithmetic logic unit (ALU) 206, which feeds its output to computed feature registers 208. A classification unit 210 reads data from the computer feature registers 210, and outputs contexts to data registers 212. The data registers 112 are coupled to an I2C bus interface 214. In addition, an interrupt generator 202 is coupled to the output of the charge pump 200, and the output thereof may be read by the SoC 116. Configuration registers 216 are coupled to the filter 204, ALU 206, computed feature registers 208, and classification unit 210. In addition to the connections described above, the outputs of the filter 204, ALU 206, and computed feature registers 208 are also each coupled to the data registers 212.

In operation, the accelerometer 108 and gyroscope 110 each output data for the three spatial dimensions X, Y, Z. This data is received by the multiplexer 190, which selectively multiplexes that data to the charge pump 200. The charge pump 200 outputs that data to the filter 204 which may be an analog or digital filter. The filter 204 filters the data and outputs it to an arithmetic logic unit (ALU) 206.

The ALU 206 serves to extract features of the data itself, such as a mean acceleration over a given period of time, deviance of that mean acceleration, radian acceleration, number of acceleration peaks, number of zero crosses, peak acceleration values, linear acceleration values, energy in bands, mean of roll, pitch, and yaw, variance of roll, pitch, and yaw, mean of linear acceleration, variance of linear acceleration, etc. This list of features that may be extracted from the data is not intended to be exhaustive. Indeed, the ALU may extract any useful features from accelerometer 108 or gyroscope 110 data, and all such features are within the scope of this disclosure.

The computed feature registers 208 store the features extracted by the ALU 206. The classification unit 210 may be a separate ALU, and classifies the context of the electronic device 100 based upon the features extracted by the ALU and stored in the computed feature registers 208. For example, the context of the electronic device 100 may be where on the user's body it is carried (i.e. in pocket, in hand, in holster), a current method of locomotion of the user (i.e. running, walking, driving, bicycling, climbing stairs), or an orientation of the electronic device 100 with respect to gravity. Another example context may be movement of the electronic device 100 in a gesture, such as a user raising a smartwatch in to a position to view the screen thereof, shaking the electronic device 100, double tapping the touch sensitive display 103 of the electronic device 100, rotating the electronic device 100 either clockwise or counterclockwise, and swiping the touch sensitive display 103 to the left, right, top, or bottom.

The contexts classified by the classification unit 210 are then stored in the data registers 212, and may in turn be read out by the I2C bus 214 to the SoC 116. The SoC 116 then uses the classified contexts in its operations. The interrupt generator 202 serves to generate interrupts for the SoC 116 so as to facilitate communication between the configurable sensing unit 107 and the SoC 116.

In some applications, the multiplexer 190 may receive additional data from the SoC 116. For example, the SoC 116 may send additional data from the light sensor 102, magnetometer 104, barometer 106, microphone 114, proximity sensor 118, or touch sensitive display 103 to the multiplexer 190, such that this data may be used by the other components of the sensor unit 107.

The described functionalities of the filter 204, ALU 206, and classification unit 210 operate in accordance with configuration data stored in the configuration registers 216. For example, the configuration data may be changeable parameters of the processing technique performed by the control circuit 112. Thus, the configuration data may change the pre-processing performed by the control circuit 112 by either replacing the filtering technique performed by the filter 204, or by replacing the values of the coefficients of the filter 204.

The configuration data may change the performance level of the sensor unit 107 by altering the balance between latency, accuracy, and power consumption. This balance may be changed by altering the acquisition rate of the data, and thus the rate at which the multiplexer 190 switches from among its various inputs. This balance may also be changed by altering the range of accepted values of the data, for example by the ALU 206 ignoring data outside of the range of accepted values when extracting or computing features of the data.

The configuration data may change the techniques used by the ALU 206 to extract and compute the features from the data. The ALU 206 may be programmed to extract and compute a plurality of features from the data, and the configuration data may serve to select a subset of that plurality of features for the ALU 206 to actually extract and compute. In some cases, the configuration data may program or reprogram the ALU 206 for extracting and computing different features. The configuration data may also program or reprogram the way in which the ALU 206 extracts and computes any of the features.

The balance between latency, accuracy, and power consumption may also be altered by the configuration data switching operation of the sensor unit 107 between a lower power consumption mode and a higher power consumption mode. In the lower power consumption mode, the ALU 206 extracts and computes a smaller subset of features of the plurality of features which the ALU 206 is programmed to extract and compute, whereas in the higher power consumption mode, the ALU 206 extracts and computes a larger subset (or all) of the features of the plurality of features which the ALU 206 is programmed to extract and compute. When these lower and higher power consumption modes are used, the sensor unit 107 operates in the lower power consumption mode until features of a threshold value or values are extracted by the ALU 206, at which point the sensor unit 107 switches to operation in the higher power consumption mode.

The configuration data may change the techniques used by the classification unit 210 for classifying the features extracted and computed by the ALU 206 and stored in the computed feature registers 208, for example by using a decision tree. The classification unit 210 may be programmed to classify the features into a plurality of contexts, and the configuration data may select a subset of that plurality of contexts for the classification unit 210 to classify. In addition, the configuration data may program or reprogram the classification unit 210 for classifying and determining different contexts. The configuration data may also program or reprogram the way in which the classification unit 210 classifies and determines the different contexts.

The SoC 116 may receive additional or new configuration data from the transceiver 101, and it may then pass this additional or new configuration data to the configuration registers 216. In some instances, the SoC 116 may generate the additional or new configuration data itself, for example based upon user input, and then pass the additional or new configuration data to the configuration registers 216.

It should be understood that the configuration data stored in the configuration registers 216 may operate on the various components in a variety of ways. For example, the configuration data may directly provide the techniques or algorithms used by the various components, may select which pre-programmed techniques or algorithms are to be used, may provide the coefficients used by the techniques or algorithms, or may replace standard techniques, algorithms, or coefficients. Thus, the various components may operate in a first fashion in the absence of the configuration data, and in a second fashion in the presence of the configuration data. The configuration registers 216 are reprogrammable on the fly by the SoC 116, and thus the alteration of the operation of the sensor unit 107 may not involve the changing of firmware. Therefore, the various components may be considered to be fully programmed at a first point in time, and that programming may be changed by the configuration data at a second point in time.

In addition to the power savings provided by this sensor unit 107, the sensor unit 107 facilitates easier manufacture of electronic devices 100. Due to the configuration data being easily changeable in the configuration registers 116, different sensor units 107 need not be stocked by a manufacturer for different electronic devices 100. The same design of sensor unit 107 may be used by a manufacturer for different electronic devices 100, with differences in the configuration data stored in the configuration registers 116 of each, thereby easing manufacturing supply chain constraints.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

The invention claimed is:

1. A sensor chip mounted on a printed circuit board (PCB) and electrically coupled to a system on chip (SoC) mounted on the PCB via at least one conductive trace, the sensor chip comprising:
   configuration registers configured to store and output configuration data;
   a programmable logic device (PLD) configured to receive digital data, the PLD further configured to perform an extraction of features of the digital data in accordance with the configuration data, the configuration data comprising changeable parameters of the extraction;
   a classification circuit configured to process the extracted features of the digital data so as to generate a context of an electronic device into which the sensor chip is incorporated relative to its surroundings, the processing being performed using a processing technique operating in accordance with the configuration data, wherein the configuration data further comprises changeable parameters of the processing technique; and
   data registers, wherein the classification unit is configured to output the context to the data registers for storage.

2. The sensor chip of claim 1, further comprising computed feature registers storing the extracted features of the digital data.

3. The sensor chip of claim 1, wherein the changeable parameters of the extraction comprise which features of the digital data are selected to extract.

4. The sensor chip of claim 3, wherein the features of the digital data selected to extract include at least one of mean acceleration, radian acceleration, number of acceleration peaks, number of zero crosses, peak acceleration values, linear acceleration values, energy in bands, mean of roll, pitch, and yaw, variance of roll, pitch, and yaw, mean of linear acceleration, variance of linear acceleration.

5. The sensor chip of claim 3, wherein the configuration data contains parameters for operating the sensor chip between a low power consumption mode and a high power consumption mode; wherein in the low power consumption mode, the PLD extracts a first subset of features of the digital data; wherein in the high power consumption mode, the PLD extracts at least a second subset of features of the digital data, the second subset containing more features of the digital data than the first subset; and wherein the PLD is configured to selectively switch between the low power consumption mode and the high power consumption mode.

6. The sensor chip of claim 5, wherein the PLD is configured to operate in the low power consumption mode until at least one of the extracted features exceeds a threshold, and to operate in the high power consumption mode for a period of time thereafter.

7. The sensor chip of claim 1, further comprising:
   a MEMS sensor configured to generate a plurality of analog data outputs;
   a selection circuit receiving the plurality of analog data outputs and configured to pass a selected one of the plurality of analog data outputs; and
   an analog to digital converter configured to convert the selected one of the plurality of analog data outputs to the digital data.

8. The sensor chip of claim 7, further comprising a charge pump configured to boost the selected one of the plurality of analog data outputs prior to conversion by the analog to digital converter.

9. The sensor chip of claim 7, wherein the MEMS sensor contains at least an accelerometer and a gyroscope; and wherein the plurality of analog data outputs includes analog accelerometer data output and analog gyroscope data output.

10. The sensor chip of claim 9, wherein the plurality of analog data outputs also includes analog output data from an external source.

11. The sensor chip of claim 10, wherein the analog output data from the external source includes at least one of analog light sensor output data, analog magnetometer output data, analog barometer output data, analog microphone output data, analog proximity sensor output data.

12. The sensor chip of claim 7, wherein the selection circuit selects different ones of the plurality of analog data outputs to pass in accordance with the configuration data; and wherein the configuration data also includes a selection change rate for the selection circuit.

13. The sensor chip of claim 12, wherein the plurality of analog data outputs includes analog data outputs from the MEMS sensor in addition to analog data outputs from an external source; and wherein the selection change rate comprises a first selection change rate for the analog data outputs from the MEMS sensing unit and a second selection change rate for the analog data outputs from the external source, with the second selection change rate being lesser than the first selection change rate.

14. The sensor chip of claim 1, further comprising a digital filter configured to filter the digital data prior to extraction of the features by the PLD in accordance with a digital filtering technique, the filtering being performed in accordance with the configuration data, wherein the configuration data further comprises changeable parameters of the digital filtering technique.

15. The sensor chip of claim 14, wherein the changeable parameters of the digital filtering technique include which digital filtering technique is performed and/or which coefficients are used by the digital filtering technique.

16. The sensor chip of claim 1, further comprising a bus interface configured to receive the context from the data registers and to facilitate transmission of the context from the data registers to another device.

17. The sensor chip of claim 16, wherein the bus interface comprises an Inter-Integrated Circuit (I²C) bus interface.

18. The sensor chip of claim 1, wherein the PLD is configured to ignore digital data falling outside of a given range when extracting the features of the digital data, in accordance with the configuration data; and wherein the configuration data also includes the given range.

19. The sensor chip of claim 1, wherein the classification circuit comprises an arithmetic logic unit (ALU) circuit.

20. The sensor chip of claim 1, wherein the PLD comprises an arithmetic logic unit (ALU) circuit.

21. The sensor chip of claim 1, wherein the context of the electronic device relative to its surroundings comprises at least one of a mode of locomotion of a user carrying the electronic device, a position of the electronic device on the body of the user, and a gesture in which the electronic device has been moved.

22. The sensor chip of claim 21, wherein the gesture in which the electronic device has been moved comprises at least one of raising the electronic device into position for screen viewing, shaking the electronic device, double tapping the electronic device, rotating the electronic device, and swiping the electronic device in at least one direction.

23. An electronic device, comprising:
a printed circuit board (PCB) having at least one conductive trace thereon;
a system on chip (SoC) mounted on the PCB and electrically coupled to the at least one conductive trace; and
a sensor chip mounted on the PCB in a spaced apart relation with the SoC and electrically coupled to the at least one conductive trace such that the sensor chip and SoC are electrically coupled;
wherein the sensor chip comprises:
configuration registers configured to store and output configuration data;
a MEMS sensor configured to generate a plurality of analog data outputs;
a selection circuit receiving the plurality of analog data outputs and configured to pass a selected one of the plurality of analog data outputs;
an analog to digital converter configured to convert the selected one of the plurality of analog data outputs to digital data;
a programmable logic device (PLD) configured to receive the digital data, the PLD further configured to perform an extraction of features of the digital data in accordance with the configuration data, the configuration data comprising changeable parameters of the extraction; and
a classification circuit configured to process the extracted features of the digital data so as to generate a context of an electronic device into which the sensor chip is incorporated relative to its surroundings, the processing being performed using a processing technique operating in accordance with the configuration data, wherein the configuration data further comprises changeable parameters of the processing technique.

24. The electronic device of claim 23, further comprising computed feature registers storing the extracted features of the digital data.

25. The electronic device of claim 23, wherein the changeable parameters of the extraction comprise which features of the digital data are selected to extract.

26. The electronic device of claim 25, wherein the features of the digital data selected to extract include at least one of mean acceleration, radian acceleration, number of acceleration peaks, number of zero crosses, peak acceleration values, linear acceleration values, energy in bands, mean of roll, pitch, and yaw, variance of roll, pitch, and yaw, mean of linear acceleration, variance of linear acceleration.

27. The electronic device of claim 25, wherein the configuration data contains parameters for operating the PLD between a low power consumption mode and a high power consumption mode; wherein in the low power consumption mode, the PLD extracts a first subset of features of the digital data; wherein in the high power consumption mode, the PLD extracts at least a second subset of features of the digital data, the second subset containing more features of the digital data than the first subset; and wherein the PLD is configured to selectively switch between the low power consumption mode and the high power consumption mode.

28. The electronic device of claim 27, wherein the PLD is configured to operate in the low power consumption mode until at least one of the extracted features exceeds a threshold, and to operate in the high power consumption mode for a period of time thereafter.

29. The electronic device of claim 23, further comprising a charge pump configured to boost the selected one of the plurality of analog data outputs prior to conversion by the analog to digital converter.

30. The electronic device of claim 23, wherein the selection circuit selects different ones of the plurality of analog data outputs to pass in accordance with the configuration data; and wherein the configuration data also includes a selection change rate for the selection circuit.

31. The electronic device of claim 23, further comprising a digital filter configured to filter the digital data prior to extraction of the features by the PLD in accordance with a digital filtering technique, the filtering being performed in accordance with the configuration data, wherein the configuration data further comprises changeable parameters of the digital filtering technique.

32. The electronic device of claim 31, wherein the changeable parameters of the digital filtering technique include which digital filtering technique is performed and/or which coefficients are used by the digital filtering technique.

33. The electronic device of claim 23, wherein the PLD is configured to ignore digital data falling outside of a given range when extracting the features of the digital data, in accordance with the configuration data; and wherein the configuration data also includes the given range.

34. The electronic device of claim 23, wherein the classification circuit comprises an arithmetic logic unit (ALU) circuit.

35. The electronic device of claim 23, wherein the PLD comprises an arithmetic logic unit (ALU) circuit.

* * * * *